United States Patent [19]

Hochstrasser et al.

[11] 4,444,948

[45] * Apr. 24, 1984

[54] MANUFACTURE OF INSULATED ELECTRIC CONDUCTORS

[75] Inventors: Ulrich Hochstrasser, Ecublens; Eberhard Kertscher, Romanel-sur-Lausanne, both of Switzerland

[73] Assignee: Maillefer, S.A., Canton of Vaud, Switzerland

[*] Notice: The portion of the term of this patent subsequent to Sep. 28, 1999 has been disclaimed.

[21] Appl. No.: 357,608

[22] Filed: Mar. 12, 1982

Related U.S. Application Data

[63] Continuation of Ser. No. 134,634, Mar. 27, 1980, Pat. No. 4,351,790.

[30] Foreign Application Priority Data

Apr. 3, 1979 [CH] Switzerland ............... 3101/79

[51] Int. Cl.³ ............................................. B29D 23/01
[52] U.S. Cl. ...................... 525/61; 174/110 PM; 174/110 S; 264/209.6; 264/210.6; 264/211; 428/36; 525/101; 525/106; 525/288
[58] Field of Search ............... 525/288, 61, 101, 106; 264/174, 209.6, 210.6, 211, 236, 347, 176 R; 174/110 PM, 110 S; 428/36, 447, 450

[56] References Cited

U.S. PATENT DOCUMENTS

| | | | |
|---|---|---|---|
| 3,358,327 | 12/1967 | Maillefer | 425/378 R |
| 3,433,573 | 3/1969 | Holladay et al. | 264/564 |
| 3,862,265 | 1/1975 | Steinkamp et al. | 264/176 R |
| 3,957,719 | 5/1976 | MacKenzie, Jr. | 264/174 |
| 4,058,583 | 11/1977 | Glander et al. | 264/176 R |
| 4,117,063 | 9/1978 | Voigt et al. | 264/174 |
| 4,117,195 | 9/1978 | Swarbrick et al. | 264/174 |
| 4,135,825 | 1/1979 | Kertscher | 366/79 |
| 4,136,132 | 1/1979 | Poole | 525/288 |
| 4,228,255 | 10/1980 | Fujimoto et al. | 264/176 R |
| 4,351,790 | 9/1982 | Hochstrasser et al. | 264/174 |

FOREIGN PATENT DOCUMENTS

| | | |
|---|---|---|
| 2350876 | 4/1974 | Fed. Rep. of Germany . |
| 2419210 | 10/1975 | Fed. Rep. of Germany . |
| 2419209 | 11/1975 | Fed. Rep. of Germany . |
| 2217362 | 9/1974 | France . |
| 2297713 | 8/1976 | France . |
| 964428 | 7/1964 | United Kingdom . |
| 1526398 | 9/1978 | United Kingdom . |
| 2002395 | 2/1979 | United Kingdom . |

*Primary Examiner*—Jeffery R. Thurlow
*Attorney, Agent, or Firm*—Parkhurst & Oliff

[57] ABSTRACT

A mixture of substances is fed to an extruder and, after being homogenized and liquefied, is extruded on an electric conductor or as a pipe. To meet electric cable specifications, the insulating material used is a polyolefin, such as polyethylene, cross-linking of which is brought about by the addition of a silane, a free-radical generator, and a silanol condensation catalyst. After extrusion, cross-linking takes place in the presence of moisture. To facilitate penetration of the moisture and accelerate cross-linking, an agent capable of reducing the rate of crystallization of the polymer, such as vinyl acetate, is used as a further additive.

1 Claim, No Drawings

MANUFACTURE OF INSULATED ELECTRIC CONDUCTORS

This is a continuation of application Ser. No. 134,634 filed Mar. 27, 1980, now U.S. Pat. No. 4,351,790 issued Sept. 28, 1972.

This invention relates to insulated electric conductors, more particularly to such conductors of the type having an insulating covering of cross-linked plastic material, and to a method for their manufacture.

During the past few years, there has been a rapid development in the technology for manufacturing insulated electric cable intended to conduct current at high or low voltages. This development is likewise noted in the manufacture of certain kinds of pipes and tubing made of synthetic materials analogous to those used for forming the insulating sheaths of cable.

German Disclosed Application (DOS) No. 23 50876 teaches the reaction of certain polymers, such as ethylene and vinyl acetate copolymers, with a silane in the presence of a free-radical generator, then exposing this product, containing various additives as well, to water in order to cause cross-linking of the polymer. These materials can be shaped by extrusion, followed by a treatment in the presence of either boiling water or water at a temperature between 50° and 80° C.

French Published Application No. 2,217,362 and German Disclosed Application (DOS) Nos. 24 19209 and 24 19210 also relate to methods and products of the same type.

According to U.K. Published Application No. 2,002,395, electric cable insulated with an elastomer coating which can be cross-linked in the presence of moisture can be produced by carrying out the cross-linking in an enclosure containing pressurized steam at a temperature between about 150° and 200° C. A method of the same type is also described in French Published Application No. 2,297,713.

These prior art methods generally include three steps: during the first step, the liquid silane is mixed with the polymer or copolymer forming the main component of the material to be extruded; the other additives are not combined with this mixture until the extrusion step, which is followed by the cross-linking step.

Certain drawbacks of these prior art methods could be eliminated by a technique described particularly in U.S. Pat. No. 4,117,195, according to which the three-step method described above is replaced by a two-step method. Non-copolymerized polyethylene and the necessary additives are each added separately at the inlet of a screw extruder in which the mixing, kneading, and homogenization of the substances are actively carried out in such a way as to produce the material to be extruded directly at the outlet of the extruder.

The second step of this method is the cross-linking of the shaped material, which constitutes the insulating covering of a cable or a pipe. According to U.S. Pat. No. 4,117,195, cross-linking is effected by means of a treatment in boiling water, for example.

The present invention is intended to improve still further the method described in the aforementioned U.S. patent, for it has been noted that the manufacture of electric cable or of pipes can be appreciably speeded up by reducing the number of steps of the method to two. However, the necessity of a cross-linking treatment lasting several hours, in a vat of either boiling water or water at a temperature on the order of 95° C., is all the more burdensome in that the first step is so much faster. As a matter of fact, the investment necessary for installing and maintaining vats containing water at the required temperature prevents production costs from being reduced as much as desired.

It is possible, of course, to carry out the cross-linking in a moist atmosphere at room temperature, but this takes three weeks or longer.

It is an object of this invention to provide an improved method of the aforementioned type in which cross-linking may be carried out in a moist atmosphere in only a few days.

To this end, there is provided according to the present invention a method of producing a tubular element of cross-linked plastic material, particularly an insulating covering for an electric conductor, comprising feeding a screw-extruder divided into a heating zone, a plasticizing zone, and a homogenizing zone, with a polymer capable of being cross-linked by the use of a hydrolyzable unsaturated silane, and with additives in metered quantities, particularly the hydrolyzable unsaturated silane, the latter being introduced separately into the extruder, a free-radical generator, and a silanol condensation catalyst, preparation of a homogeneous mass by active stirring of the foregoing substances in the extruder, extrusion of the homogenized material, and cross-linking of the extruded product in the presence of moisture, wherein the additives include an agent capable of reducing the rate of crystallization of the polymer, and cross-linking is carried out in a moist air atmosphere.

There is further provided according to this invention a tubular element produced by the foregoing method.

The invention is based upon the unexpected finding that certain known additives, which may be incorporated in the polymer in metered quantities, act to reduce the rate of crystallization of the polymer and give the extruded product sufficient permeability to water so that the humidity in the atmosphere allows cross-linking to develop at a rate such that the cable or pipe meets the usual specifications after a relatively very short storage time provided that the ambient temperature is 20° C. or higher and the relative humidity is at least 60%.

Thus, for example, it is possible to insulate electric cable or to produce cross-linked plastic pipes or tubing by this method in countries having a hot, damp climate by outdoor storage of the reels wound after the extrusion step. It has been found that under the conditions stated above, the rate of cross-linking is such that the cable meets the IEC (International Electrotechnical Commission) specifications after 96 hrs. of storage. If it is necessary to meet even stricter specifications as required in certain countries, the storage time must be increased accordingly; but it has been found that 12 days of storage suffices to meet the strictest requirements.

A preferred embodiment of the invention will now be described in detail based upon the following example.

An electric cable made of copper wires and intended to conduct current at a voltage of 1 kV was provided with an insulating coating by passing it through an extrusion head fixed to the downstream end of an extruder barrel. The extruder was one comprising three zones, viz., a heating zone, a plasticizing zone, and a homogenizing zone, e.g., an extruder such as is described in U.S. Pat. No. 4,117,195. Extruders of that type are also described in GB Pat. No. 964,428 and in U.S. Pat. No. 3,358,327. The screw of the extruder included several zones with differing thread configurations. In the plasticizing zone, the screw had two interposed threads of different pitches defining two channels, one a channel of decreasing cross-section from which the material is forced over one of the threads into the second channel of gradually increasing cross-section. This arrangement produced a completely homogeneous mixture of the various materials fed to the hopper of the extruder, e.g., components in the form of powder or pellets and liquid components. These materials comprised polyethylene and various additives, particularly hydrolyzable unsaturated silane, a free-radical generator, and a silanol condensation catalyst, these additives being provided in sufficient proportions to bring about the subsequent cross-linking of the polyethylene in the presence of water.

In the present example, polyethylene having particles comprising vinyl acetate in a proportion of 6% by weight for reducing the crystallization rate was first produced. The following table indicates the percentages by weight, relative to the copolymer, of the other substances fed to the extruder:

Carbon black: 10.0%
Dicumyl peroxide: 0.1%
Vinyl trimethoxy silane: 1.5%
Polymerized trimethyl dihydro-quinoline: 0.5%
Dibutyl tin dilaurate: 0.05%

After processing in the extruder, these materials were extruded in a transverse head through which the electric conductor passed.

After extrusion, which took place under normal conditions, and after cooling of the cable by passing it through a vat of water, the cable was wound on standard reels and stored outdoors in an atmosphere having a relative humidity of 60% and an ambient temperature of 20° C.

After 96 hours of storage, cross-linking was found to have taken place, the rate of cross-linking of the insulation corresponding to the IEC specifications for low-voltage cable.

The proportion of vinyl acetate in the mixture fed to the extruder may vary within rather wide limits, e.g., from 0.5% to 30%. However, it is preferable not to exceed 15%, and the most advantageous proportions are from 2% to 10%.

Instead of polyethylene, other polyolefins may be used as the polymer, as stated in the aforementioned U.S. Pat. No. 4,117,195.

Instead of vinyl acetate, it is also possible to use polyvinyl acetates, vinyl acrylate, butyl acrylate, or polymers of these substances.

These substances act upon the polymer to lower its rate of crystallization during cooling. However, within the aforementioned limits, they have no unfavorable influence on the dielectric and mechanical quanlities of the insulation, which therefore completely satisfies the insulating requirements. As for mechanical strength, it has even been found that the breaking-strength under stress is increased when the crystallization inhibitor is polyvinyl acetate.

Because the crystallization process is retarded, water penetrates deeply into the insulating coating even if it is thick. The reaction of the silane with the polyolefin and with the water therefore takes place deeply more quickly than when crystallization proceeds normally.

Instead of introducing the agent for reducing the rate of crystallization into the hopper of the extruder separately or incorporated in the polymer, it may be introduced by injection into the barrel of the extruder through a pipe-line connected to an intake opening in the barrel as taught in U.S. Pat. No. 4,135,825.

What is claimed is:

1. A tubular element of cross-linked plastic material, particularly an insulating covering for an electric conductor, produced by the method wherein a polymer capable of being cross-linked by the use of a hydrolyzable unsaturated silane is fed, together with metered quantities of additives including a free-radical generator and a silanol condensation catalyst, to a screw-type extruder divided into a heating zone, a plasticizing zone, and a homogenizing zone; a metered quantity of a hydrolyzable unsaturated silane is added separately to the extruder; the foregoing substances are actively stirred in the extruder until a homogeneous mass is obtained; the homogenized mass is extruded; and cross-linking of the product is carried out in the presence of moisture, wherein among said additives is an agent capable of reducing the rate of crystallization of said polymer to enhance penetration of said moisture into said extruded mass, thus increasing the speed of said cross-linking, said agent drawn from the group consisting of vinyl acetate, vinyl acrylate, butyl acrylate and polymers thereof in a proportion of 0.5% to 15% by weight relative to said polymer capable of being cross-linked by the use of a hydrolyzable unsaturated silane, and carrying out said cross-linking in a moist air atmosphere, said moist air atmosphere exhibiting a relative humidity of at least 60% and a temperature of at least 20° C.

* * * * *